United States Patent
Schepers et al.

(10) Patent No.: US 10,469,245 B2
(45) Date of Patent: Nov. 5, 2019

(54) CRYPTOGRAPHIC SYSTEM AND METHOD

(71) Applicant: KONINKLIJKE PHILIPS N.V., Eindhoven (NL)

(72) Inventors: Hendrik Jan Jozef Hubertus Schepers, Veldhoven (NL); Paulus Mathias Hubertus Mechtildis Antonius Gorissen, Eindhoven (NL); Maarten Peter Bodlaender, Eindhoven (NL); Wicher Ido-Jan Gispen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 187 days.

(21) Appl. No.: 15/538,232

(22) PCT Filed: Dec. 11, 2015

(86) PCT No.: PCT/EP2015/079334
§ 371 (c)(1),
(2) Date: Jun. 21, 2017

(87) PCT Pub. No.: WO2016/102202
PCT Pub. Date: Jun. 30, 2016

(65) Prior Publication Data
US 2017/0346621 A1    Nov. 30, 2017

(30) Foreign Application Priority Data

Dec. 24, 2014   (JP) ...................................... 14200285

(51) Int. Cl.
*H04L 9/00*   (2006.01)

(52) U.S. Cl.
CPC .......... *H04L 9/002* (2013.01); *H04L 2209/16* (2013.01)

(58) Field of Classification Search
CPC ...................................................... H04L 9/002
See application file for complete search history.

(56) References Cited

U.S. PATENT DOCUMENTS

| | | | |
|---|---|---|---|
| 6,064,741 A | 5/2000 | Horn | |
| 6,301,660 B1 * | 10/2001 | Benson | G06F 21/10 380/280 |

(Continued)

FOREIGN PATENT DOCUMENTS

| | | |
|---|---|---|
| CN | 101677269 A1 | 3/2010 |
| JP | H04232588 A | 8/1992 |

(Continued)

OTHER PUBLICATIONS

Chow et al: "White-Box Cryptography and an AES Implementation"; SAC 2002, LNCS 2595, pp. 250-270, 2003.

*Primary Examiner* — Ponnoreay Pich

(57) ABSTRACT

A system for cryptographic processing comprises message unit (1, 7, 12) for providing a first message representation (3, 6, 11), wherein the first message representation is a representation of a message. The system comprises key unit (2) for providing a key representation (4, 9, 14), wherein the key representation is an encrypted representation of a first key of a first cryptographic algorithm and a second key of a second cryptographic algorithm, wherein the first cryptographic algorithm is different from the second cryptographic algorithm. The system comprises step unit (5, 10, 15) for performing a step of the first cryptographic algorithm and a step of the second cryptographic algorithm based on the first message representation (3, 6, 11) and the key representation, to obtain a second message representation (6, 11, 16).

13 Claims, 2 Drawing Sheets

(56) References Cited

U.S. PATENT DOCUMENTS

| | | | |
|---|---|---|---|
| 2002/0019943 A1* | 2/2002 | Cho | G06F 21/10 726/27 |
| 2002/0080972 A1 | 6/2002 | Kato et al. | |
| 2002/0184492 A1* | 12/2002 | Hori | G06F 21/10 713/158 |
| 2009/0235087 A1* | 9/2009 | Bird | G06F 21/10 713/190 |
| 2010/0303231 A1 | 12/2010 | Gorissen et al. | |
| 2011/0119503 A1* | 5/2011 | Diehl | G06F 21/121 713/193 |
| 2014/0351911 A1 | 11/2014 | Yang et al. | |
| 2016/0050069 A1* | 2/2016 | Griffin | G06F 21/602 713/189 |
| 2017/0109539 A1* | 4/2017 | Kinasz | H04L 9/00 |

FOREIGN PATENT DOCUMENTS

| | | |
|---|---|---|
| JP | H08335040 A | 12/1996 |
| JP | 2006254099 A | 9/2006 |
| JP | 2010539535 A | 12/2010 |
| WO | 2007105126 A2 | 9/2007 |
| WO | 2008141992 A1 | 11/2008 |
| WO | 2009034504 A2 | 3/2009 |
| WO | 2010146139 A1 | 12/2010 |
| WO | 2013104969 A1 | 7/2013 |
| WO | 2014095772 A1 | 6/2014 |
| WO | 2014096117 A1 | 6/2014 |

* cited by examiner

CRYPTOGRAPHIC SYSTEM AND METHOD

CROSS-REFERENCE TO PRIOR APPLICATIONS

This application is the U.S. National Phase application under 35 U.S.C. § 371 of International Application No. PCT/EP2015/079334, filed on Dec. 11, 2015, which claims the benefit of or European Patent Application No. 14200285.6, filed on Dec. 24, 2014. These applications are hereby incorporated by reference herein.

FIELD OF THE INVENTION

The invention relates to a cryptographic system and method.

BACKGROUND OF THE INVENTION

When distributing software packages to customers, for instance in view of a software purchase, an evaluation trial, or a software upgrade, it is known to establish a binding with the owner of the software. Moreover, it is known to take precautions to ensure only authorized customers can access the software package. A known way to do this is by encrypting the package or its interfaces by means of a standardized cipher, for instance AES or DES. A disadvantage of this approach is that a malign user can decrypt the package using the official key and then easily re-encrypt the package with another key of his choice (since the malign user knows the key-schedule of the cipher used) and, in the extreme case, the malign user could, after re-encrypting the package, resell the application as if the program was his or hers.

"White-Box Cryptography and an AES Implementation", by S. Chow, P. A. Eisen, H. Johnson, and P. C. van Oorschot, in: Proceeding SAC 2002 Revised Papers from the 9th Annual International Workshop on Selected Areas in Cryptography, pages 250-270, Springer-Verlag London, UK discloses a method called white-box cryptography, in which the key is expanded into one or more look-up tables that are an integral part of the implementation of the cipher. The inputs and outputs of these look-up tables are encoded, possibly using different encodings, to make it more difficult to understand the process steps that the look-up tables represent.

SUMMARY OF THE INVENTION

It would be advantageous to have an improved cryptographic system. To better address this concern, a first aspect of the invention provides a system comprising message unit for providing a first message representation, wherein the first message representation is a representation of a message;

key unit for providing a key representation, wherein the key representation is an encrypted representation of a first key of a first cryptographic algorithm and a second key of a second cryptographic algorithm, wherein the first cryptographic algorithm may be different from the second cryptographic algorithm;

step unit for performing a step of the first cryptographic algorithm and a step of the second cryptographic algorithm based on the first message representation and the key representation, to obtain a second message representation, wherein the second message representation is an encrypted representation of a result of the step of the first cryptographic algorithm and a result of the step of the second cryptographic algorithm.

This way of interweaving two cryptographic algorithms by obtaining an encrypted representation of a result of the step of the first cryptographic algorithm and the result of the step of the second cryptographic algorithm allows to enlarge the key space, because both keys contribute to the key space. Further, this system allows to perform two cryptographic algorithms on the data simultaneously, while keeping the result in an encrypted format.

The step unit may comprise a look-up unit for looking up the second encrypted representation in a look-up table or a network of look-up tables, wherein the look-up table or network of look-up tables comprises a mapping from combinations of first message representations and key representations to corresponding second message representations. This is an example of how the step of both cryptographic algorithms can be performed simultaneously with encrypted representation of the results.

The step of the first cryptographic algorithm and the step of the second cryptographic algorithm may involve the same operation, wherein at least one parameter of the operation of the step of the first cryptographic algorithm is different from the corresponding parameter of the step of the second cryptographic algorithm. This is a convenient way to create a different cipher for the second cryptographic algorithm compared to the cipher of the first cryptographic algorithm.

The first cryptographic algorithm may comprise a first plurality of steps, and the second cryptographic algorithm may comprise a second corresponding plurality of steps, wherein a step (or each step) of the first plurality of steps differs from each corresponding step of the second plurality of steps by at most one or more parameter values. This is a convenient way to create a different cipher for the second cryptographic algorithm compared to the cipher of the first cryptographic algorithm.

The first cryptographic algorithm may comprise a first sequence of steps, and the second cryptographic algorithm may comprise a corresponding second sequence of steps, wherein the message unit is configured to provide the first message representation, wherein the first message representation is an encrypted representation of a result of a previous step of the first cryptographic algorithm and a result of a previous step of the second cryptographic algorithm obtained from a further step unit for performing the previous step of the first cryptographic algorithm and the previous step of the second cryptographic algorithm based on a message representation and a key representation. This allows to perform a sequence of steps, of both cryptographic algorithms, in an encrypted domain.

The system may comprise a validation unit for validating the key representation based on a result of the second cryptographic algorithm. The result of the second cryptographic algorithm may be used to determine whether the key representation satisfies certain conditions.

The validation unit may be configured to compare an output of the second cryptographic algorithm with an input message. This is an example way to validate the key representation. For example, the second cryptographic algorithm may be configured to output a copy of the input message or a simple transformation of the input message, if the second key is an element of a predetermined set of allowed keys, and to output something else if the second key is not an element of this predetermined set of allowed keys. The validation unit may be configured to check if the output of the second cryptographic algorithm is equal to the input message or simple transformation of the input message, by comparing the output of the second cryptographic algorithm with the input message. Because a malicious user does not know this set of allowed keys, it is difficult to find an element of this set of allowed keys.

The validation unit may be configured to combine an output of the second cryptographic algorithm with a further first message representation in a cipher block mode. This further first message representation may be a next block of data to be processed, in a cipher block mode. The output of the second cryptographic algorithm can be combined with the next block to create a mode of cipher-block chaining.

The step unit may be hidden in a white-box cryptographic implementation. This allows to hide the inner workings of the step. For example, the set of keys which are 'allowed' is hidden in this way.

In another aspect, two of the systems set forth above are provided: a first system and a second system. The first cryptographic algorithm of the first system may be identical to the first cryptographic algorithm of the second system, and the second cryptographic algorithm of the first system may differ from the second cryptographic algorithm of the second system. A plurality of second keys may exist for which the second cryptographic algorithm of the first system and the second cryptographic algorithm of the second system have the same result, and a plurality of second keys may exist for which the second cryptographic algorithm of the first system and the second cryptographic algorithm of the second system give a different result. This allows to target different audiences with different keys. These different audiences are addressed by using a second key that corresponds to a set of keys that are allowed by the second cryptographic algorithm used by that audience.

According to another aspect, a method of cryptographic processing is provided. The method comprises:

providing a first message representation, wherein the first message representation is a representation of a message;

providing a key representation, wherein the key representation is an encrypted representation of a first key of a first cryptographic algorithm and a second key of a second cryptographic algorithm, wherein the first cryptographic algorithm is different from the second cryptographic algorithm; and performing a step of the first cryptographic algorithm and a step of the second cryptographic algorithm based on the first message representation and the key representation, to obtain a second message representation, wherein the second message representation is an encrypted representation of a result of the step of the first cryptographic algorithm and a result of the step of the second cryptographic algorithm.

In another aspect, a method of providing a system for cryptographic processing is provided. The method comprises:

providing a unit for providing a first message representation, wherein the first message representation is a representation of a message;

providing a unit for providing a key representation, wherein the key representation is an encrypted representation of a first key of a first cryptographic algorithm and a second key of a second cryptographic algorithm, wherein the first cryptographic algorithm is different from the second cryptographic algorithm;

providing a step unit for performing a step of the first cryptographic algorithm and a step of the second cryptographic algorithm based on the first message representation and the key representation, to obtain a second message representation, wherein the second message representation is an encrypted representation of a result of the step of the first cryptographic algorithm and a result of the step of the second cryptographic algorithm; and keeping at least part of the second algorithm secret.

Since at least part of the second algorithm is kept secret, it is difficult for an attacker to find another key with which the provided system can work.

The method may further comprise providing a second system for cryptographic processing, wherein the first cryptographic algorithm of the first system is identical to the first cryptographic algorithm of the second system, and in which the second cryptographic algorithm of the first system differs from the second cryptographic algorithm of the second system, wherein a plurality of second keys exist for which the second cryptographic algorithm of the first system and the second cryptographic algorithm of the second system have the same result, and a plurality of second keys exist for which the second cryptographic algorithm of the first system and the second cryptographic algorithm of the second system have a different result. This allows to target different audiences with the different systems. Since the second algorithm of both the system and the second system are kept secret, it is difficult for an attacker to find out which keys can be used by which system.

The method may comprise providing a message using a second key for which the second cryptographic algorithm of the first system and the second cryptographic algorithm of the second system have the same result if both systems are allowed to access the message, and providing a message using a second key for which the second cryptographic algorithm of the first system and the second cryptographic algorithm of the second system have a different result if either the first system or the second system is not allowed to access the message.

The methods set forth herein may be implemented by means of a computer program product comprising instructions for causing a processing system to perform the relevant method. In addition to being implemented on a computer, e.g., as a computer implemented method, the methods set forth herein may also be implemented in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

It will be appreciated by those skilled in the art that two or more of the above-mentioned embodiments, implementations, and/or aspects of the invention may be combined in any way deemed useful.

Modifications and variations of the image acquisition apparatus, the workstation, the system, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter.

DETAILED DESCRIPTION OF EMBODIMENTS

The examples disclosed in this disclosure contain many details that are provided for purpose of illustration only. These details are not intended to limit the scope of the present disclosure. Several of the unit disclosed herein may be implemented, for example, by means of a software unit that is part of a program for a computing device.

Figure 1:
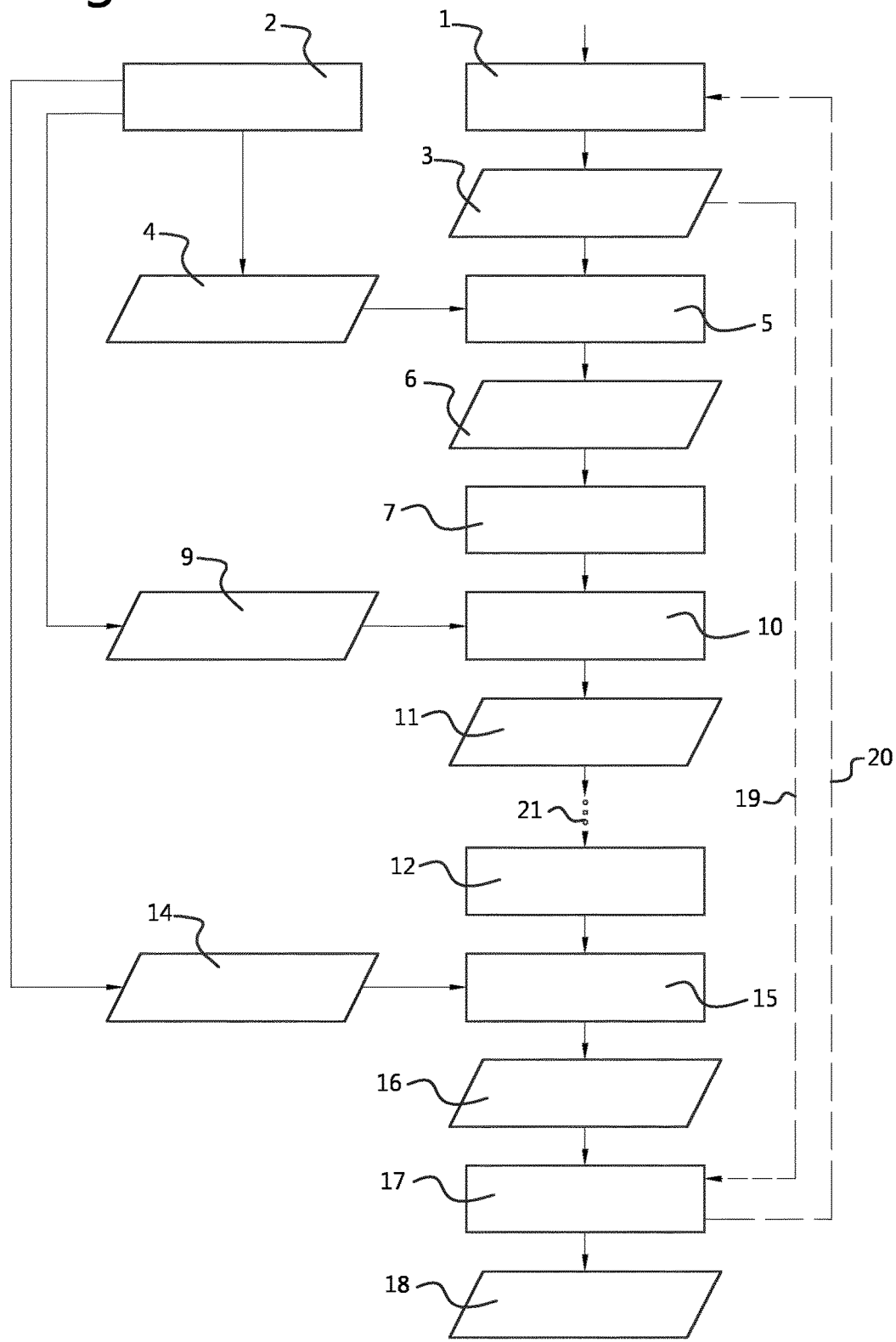
FIG. 1 is a block diagram of a system for cryptographic processing.

FIG. 1 illustrates an example of a system for cryptographic processing. The system comprises a message unit 1, which is configured to provide a message representation 3. For example, the message representation 3 is an encrypted message. The message unit 1 may be configured to receive or retrieve the message representation from an external source, for example, using communication and/or storage technology known in the art per se. Further, the system comprises a key unit 2. The key unit 2 is configured to provide a key representation 4. This key representation 4 is an encrypted representation of a first key of a first cryptographic algorithm and a second key of a second cryptographic algorithm.

These cryptographic algorithms are typically different cryptographic algorithms. In a specific example, the first cryptographic algorithm may be configured to decrypt the message representation, and the second cryptographic algorithm may be configured to perform an additional validation of the decryption. The second cryptographic algorithm is a cryptographic algorithm in the sense that it has a structure similar or identical to an encryption or decryption algorithm, such as DES or AES. The term 'structure' refers to the operations, such as the XOR operations or any S-boxes performed in the algorithm. The parameters of the second algorithm, such as the particular permutation performed by an S-box, is not to be regarded part of the 'structure' of the cryptographic algorithm.

The key representation 4 may represent the first key and the second key in an encrypted form. For example, a random bijection may be used to map any combination of a first key and a second key to a unique, randomly determined, bit string, to obtain the key representation 4 in encrypted form. This way, it is inter alia difficult for an attacker to separate the bits relating to the first key from the bits relating to the second key. Other encryptions of the first and second key may also be used to obtain the key representation 4.

Step unit 5 is configured to perform a first step of both the cryptographic algorithms. Example steps of either cryptographic algorithm include, for example, applying an S-box or an XOR operation. The step unit 5 takes the message representation 3 and the key representation 4 as input, and provides an intermediate message representation 6 as an output. The intermediate message representation 6 contains the output of the step of the first cryptographic algorithm, and the output of the step of the second cryptographic algorithm. The intermediate message representation 6 contains these outputs in an encrypted form. Similar to the way the keys are encrypted in a way that makes it difficult to separate the bits relating to the first key from the bits relating to the second key, these outputs may be encoded in a way that the information relating to the output of the step of the first algorithm cannot be easily separated from the information relating to the output of the step of the second algorithm. For example, a random bijection may be used to map any combination of a possible output of the step of the first algorithm and a possible output of the step of the second algorithm to a unique, randomly determined, bit string, to obtain the intermediate message representation 6.

This process may be repeated for the next steps of the cryptographic algorithms. However, the input is slightly different, because in the first step, the message unit 1 provides a message representation 3 of an input message and the step unit 5 outputs an intermediate message representation 6 that represents both the output of the step of the first cryptographic algorithms and the output of the step of the second cryptographic algorithm, in an encrypted form.

The message unit 7 provides this intermediate message representation 6 to the step unit 10. Step unit 10 performs the second step of both cryptographic algorithms, and hence it needs the output of the first step of the first cryptographic algorithms and the output of the first step of the second cryptographic algorithm. This information is provided by the message unit 7 in an encrypted form by means of intermediate message representation 6. Further, the step unit 10 may need keys for each cryptographic algorithm, for example round keys. These keys may be provided by key unit 2 in form of key representation 9. Key representation 9 represents those (round) keys in an encrypted form. Optionally, the key representation 9 is generated by step unit 5 and forwarded to key unit 2.

Step unit 10 outputs a further intermediate message representation 11. This intermediate message representation 11 represents the output of the second step of the first cryptographic algorithm and the second step of the second cryptographic algorithm.

As generally indicated by dots 21, further message unit and step unit may be provided, to implement the next steps of both cryptographic algorithms. These steps may be implemented in the same way as the message unit 7 and step unit 2. Further, key unit 2 may provide key representation 9 and key representation 14 as input to step unit 10 and step unit n. These key representations 9, 14 may contain round keys for both algorithms in encoded form, for example. Of course, the actual content of each unit may be different, because they implement the steps of the first cryptographic algorithm and the steps of the second cryptographic algorithm. However, the way in which the steps of the two algorithms are combined and the way in which the intermediate results are encrypted by means of e.g. bijections, is the same.

Message unit 12 receives the intermediate message representation generated by such a step unit, and provides it to step unit 15, which implements the last step of both the cryptographic algorithms. Step unit 15 further receives a key representation 14 (representing for example round keys of both cryptographic algorithms, as explained above) from key unit 2. Step unit 15 outputs a final message representation 16. Final message representation 16 may represent the output of the last step of the first cryptographic algorithm and the output of the last step of the second cryptographic algorithm. Final message representation 16 may represent these outputs in an encrypted form, as disclosed above.

Validation unit 17 performs a validation of the final message representation 16. This validation is performed based on the output of the last step of the second cryptographic algorithm, which is available in encrypted form in the final message representation. The second cryptographic algorithm, implemented by means of the step unit 5, 10, 15, is configured to cooperate with the validation unit, so that the validation succeeds for a predetermined set of second keys and fails for another predetermined set of second keys. If the set of valid keys (for which the validation succeeds) is small compared to the set of all possible keys, then it is difficult for an attacker to guess a valid key. More particularly, it is difficult to guess a key representation 4 that works with the system. The validation can be done in several ways. Therefore, there are several different possibilities of how to implement validation unit 17.

In a first example, validation unit 17 receives the message representation 3 (illustrated by arrow 19) and performs a comparison of message representation 3 and the output of the second cryptographic algorithm. In this case, the validation unit 17 may be configured to deliver the output of the first cryptographic algorithm, possibly encoded by means of a bijection as explained above, as processed message 18, if the comparison has a suitable result. If the comparison does not have the suitable result, the validation unit 17 may be configured to deliver an error message as processed message 18. This error message may, for example, consist of random bits or may comprise a predetermined string. This comparison and the generation of the appropriate output (processed message 18) can be implemented, for example, by means of a look-up table or a network of look-up tables. The look-up table may map a combination of the message representation 3 and the final message representation 16 to a corresponding processed message 18.

In a second example, validation unit 17 provides the output of the second algorithm to the message unit 1, as illustrated by arrow 20. Message unit 1 may be configured to combine the data received from the validation unit 17 with a next block of input data. This next block of input data may be processed in the same way by the system as described above. That is, after the message unit 1 has combined the next block of input data with the output of the second algorithm, the result of this combining is provided as message representation 3 to step unit 5, and so on. Other possibilities of feeding back the output of the second algorithm to the next data block will be apparent to the person skilled in the art, based on cipher block chaining schemes known in the art per se. Validation unit 17 may thus be configured to separate the output of the first cryptographic algorithm from the output of the second cryptographic algorithm. The output of the first cryptographic algorithm may be outputted as processed message 18. The processed message 18 may be encrypted using a bijection, as described above. Although the processed message 18 may contain the output of the first cryptographic algorithm regardless of the validation, if the output of the second cryptographic algorithm is not the expected one, the cryptographic processing of the next data block will fail due to the fact that the output of the second cryptographic algorithm is combined with the next data block. An example way of combining is combining by means of an XOR operation.

The step unit 5, 10, 15 may be implemented by means of look-up tables. For example, the respective step unit comprises a look-up unit for looking up the second encrypted representation in a look-up table or a network of look-up tables, wherein the look-up table or network of look-up tables comprises a mapping from combinations of first message representations and key representations to corresponding second message representations. These look-up tables may have their inputs and outputs encoded (encrypted), for example by means of a random bijection. The random bijection can change after every look-up operation. This way, both the key representation(s) and the message representations may be encrypted by means of random bijections. Such a procedure is called a white-box implementation. White box implementation of an operation is known by itself from Chow et al.

In an example, the step of the first cryptographic algorithm and the step of the second cryptographic algorithm involve the same operation, but at least one parameter of the operation of the step of the first cryptographic algorithm is different from the corresponding parameter of the step of the second cryptographic algorithm. For example, the operation in both algorithms can be to apply an S-box, but the content (which are parameter values) of the S-boxes used in both algorithms may differ.

As disclosed in the above example, the first cryptographic algorithm can comprise a first sequence of steps, and the second cryptographic algorithm can comprise a second corresponding sequence of steps. The steps of both algorithms may be identical, similar or may alternatively be different. For example, the first algorithm could include a step of applying an XOR, where the second algorithm could include a step of applying an S-box. The message unit 7, 12 is configured to provide the message representation to its step unit 10, 15, which message representation is an encrypted representation of the result of the previous step of the first cryptographic algorithm and the result of the previous step of the second cryptographic algorithm obtained from the previous step unit. For example, step unit 5 is the step unit performing the previous step in relation to the step performed by step unit 10. The successive steps of the cryptographic algorithms may be performed by the plurality of step unit 5, 10, 15.

A plurality of systems as described above may be provided. For example, these systems can be distributed to different users. The white-box encodings of the systems may differ or be the same. The first cryptographic algorithm implemented by a first system is identical to the first cryptographic algorithm implemented by the second system. However, the second cryptographic algorithm of the first system can be different from the second cryptographic algorithm of the second system. The second cryptographic algorithm of the first system is made slightly different from the second system, so that a plurality of second keys exist for which the second cryptographic algorithm of the first system and the second cryptographic algorithm of the second system deliver the same result, and a plurality of second keys exist for which the second cryptographic algorithm of the first system and the second cryptographic algorithm of the second system deliver a different result.

In a specific example, the second cryptographic algorithm of each distributed system is modified in such a way that for only a predetermined set of second keys the validation will be successful. This predetermined set can be different for each system. Alternatively, a group of users can be provided with the same system (that will work with the same set of keys), and other groups of users can be provided with respective different systems, so that each group of users has a unique set of second keys that will work. These sets of second keys may be overlapping. In such a way, a content distributor may encrypt content with a key that works with the group or groups that are allowed access to the content.

Typically, the system for cryptographic processing comprises a microprocessor (not separately shown) which executes appropriate software stored in the system device;

for example, that software may have been downloaded and/or stored in a corresponding memory, e.g., a volatile memory such as RAM or a non-volatile memory such as Flash (not separately shown). One or more of the message unit, key unit, step unit, look-up unit, and validation unit may also be equipped with microprocessors and memories (not separately shown).

In an embodiment, the system comprises a message unit circuit, key unit circuit, step unit circuit. The system may comprise additional circuits, e.g., a look-up unit circuit and a validation unit circuit. The circuits implement the corresponding units described herein. The circuits may be a processor circuit and storage circuit, the processor circuit executing instructions represented electronically in the storage circuits.

Figure 2:
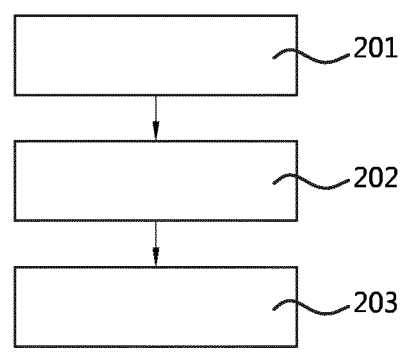
FIG. 2 is a flowchart of a method of cryptographic processing.

FIG. 2 illustrates a method of cryptographic processing. In step 201, a first message representation is provided. The first message representation is a representation of a message. In step 202, a key representation is provided. The key representation is an encrypted representation of a first key of a first cryptographic algorithm and a second key of a second cryptographic algorithm, wherein the first cryptographic algorithm is different from the second cryptographic algorithm. In step 203, a step of the first cryptographic algorithm and a step of the second cryptographic algorithm is performed based on the first message representation and the key representation, to obtain a second message representation. The second message representation is an encrypted representation of a result of the step of the first cryptographic algorithm and a result of the step of the second cryptographic algorithm. The method may be implemented, for example by means of a computer program.

Figure 3:
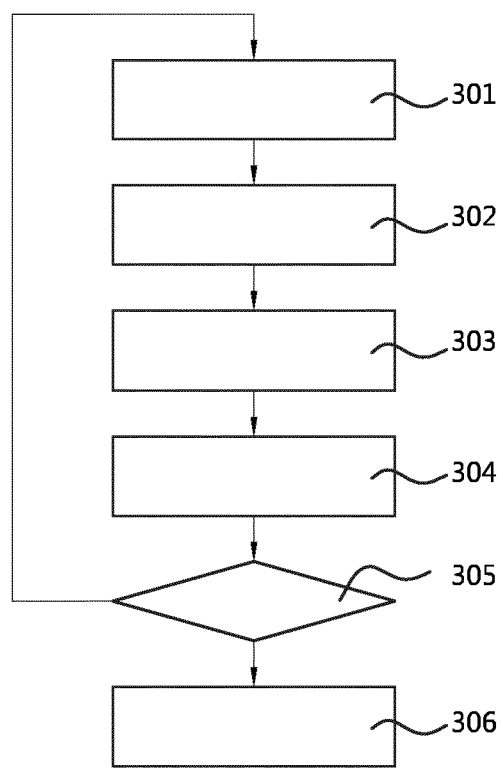
FIG. 3 is a flowchart of a method of providing cryptographic systems.

FIG. 3 illustrates a method of providing a system for cryptographic processing. In step 301, a distributor provides a user with a unit for providing a first message representation. The first message representation is a representation of a message. In step 302, the distributor provides a user with a unit for providing a key representation. The key representation is an encrypted representation of a first key of a first cryptographic algorithm and a second key of a second cryptographic algorithm, wherein the first cryptographic algorithm is different from the second cryptographic algorithm. In step 303, the distributor provides a step unit for performing a step of the first cryptographic algorithm and a step of the second cryptographic algorithm based on the first message representation and the key representation, to obtain a second message representation. The second message representation is an encrypted representation of a result of the step of the first cryptographic algorithm and a result of the step of the second cryptographic algorithm. It is noted that steps 301, 302, and 303 may be realized by providing a system as described hereinabove in respect of FIG. 1. In step 304, the distributor keeps at least part of the second algorithm secret. The potential attacker thus does not know the key schedule of the second algorithm, making it more difficult to find alternative working keys.

The method may comprise, in step 305, determining whether a second system for cryptographic processing should be provided. If this is the case, the method proceeds from step 301 to provide this second system. The first cryptographic algorithm of the first system is identical to the first cryptographic algorithm of the second system. The second cryptographic algorithm of the first system may be the same as the second cryptographic algorithm of the second system, if the second system should be capable of using the same keys as the first system. However, the distributor can also provide the second system in which the second cryptographic algorithm of the first system is different from the second cryptographic algorithm of the second system. In the latter case, the second cryptographic algorithms, and the validation unit, are selected or designed such that a plurality of second keys exist for which the second cryptographic algorithm of the first system and the second cryptographic algorithm of the second system have the same result, and a plurality of second keys exist for which the second cryptographic algorithm of the first system and the second cryptographic algorithm of the second system have a different result. If no further system needs to be provided, the method proceeds at step 306.

The method may further comprise, in step 306, providing a message using a second key for which the second cryptographic algorithm of the first system and the second cryptographic algorithm of the second system have the same result if both systems are allowed to access the message, and providing a message using a second key for which the second cryptographic algorithm of the first system and the second cryptographic algorithm of the second system have a different result if either the first system or the second system is not allowed to access the message. Step 306 may further comprise transmitting the message and the key representation representing a first key and the used second key to the provided systems.

Due to the fact that ciphers such as AES and DES are well known, and therefore their key-schedule is widely known too, the problem arises that malign customers could—after decrypting the package using the key officially intended for them—re-encrypt the package with a different key of their own choice and could even claim that the package originates from him or her. The present disclosure describes a way to limit the number of keys that work for a certain software distribution. This makes it cryptographically more difficult for a malign user to find an alternative key that works, without reducing the effective key-space of the encryption algorithm used.

In white-box cryptography the key is expanded into one or more look-up tables that are an integral part of the implementation of the cipher. Differentiation is possible, because a cryptographic algorithm with a particular key can be expanded in to look-up tables using different random encodings of the data. However, another obfuscation in the line of Chow performed by a malicious user could already make it difficult for the manufacturer of the software to recognize it as its own. Signing with a key or hashing is possible but this does not necessarily sufficiently protect the origin of the software as these methods would allow that this software is unpacked and re-packed and signed with a different method and key.

An aspect of the present disclosure is to manipulate the cipher in such a way that only keys with a certain pattern in the key work, while keeping this pattern secret. A loader will then contain a slightly modified cipher, e.g., with a non-standard S-box, and this modified cipher will only correctly decrypt for the matching keys. For instance, a manufacturer of a software package could impose that the last four bits of the key are 0101 in order to work. He could even use this mechanism to differentiate his audience, as he could use, say, the pattern 1001 for another set of customers. As long as the pattern remains secret this makes it difficult for a malign user to generate an alternative valid key. However, when this procedure (including the pattern for the valid keys) becomes known, effectively the key space of the cipher is reduced. For some ciphers the resulting key space could then become so small that an exhaustive search is feasible, and, as such, they no longer offer the security for which they once where standardized and initially were built into the application.

According to the present disclosure, a known cipher can be paired cryptographically inseparably with an unknown cipher, while at the same time expanding the key for the known cipher with a key for the unknown cipher. These two keys can be paired inseparably, so that it is not possible to extract the values of the individual keys from the inseparably paired key. The combination of the two paired ciphers is made such that it can only be used to perform its cryptographic function (e.g., decrypt a ciphertext based on an inseparable key pair) if the added key satisfies certain conditions. As the added cipher is unknown, so is its key schedule, and, hence, it is cryptographically hard for an attacker to guess a correct alternative key. In this way the package as a whole can be encrypted. By incorporating this scheme in the interfaces of the package, the consistency can be checked almost continuously.

This may be implemented, for example, using secure virtual machine (SVM) technology and piecewise equivalent ciphers. We will first elaborate on the latter and then show how these functions can be applied in an SVM setting.

Throughout this disclosure, the term "piecewise equivalent cipher" is defined as follows. A cipher A and a cipher B are called piecewise equivalent, if there is a sub-domain of the domain of all possible keys of the cipher, such that for all keys in this sub-domain, the cipher A and the cipher B provide identical output, and for all keys not in this sub-domain, the cipher A and the cipher B provide a different output.

In other words, piecewise equivalent ciphers are ciphers that are equivalent on a certain subset of the key space. It is possible to apply these ciphers to communicate with a intended audience, by distributing software implementations of cipher A to a first audience and software implementations of cipher B to a second audience. When a message is intended for both audiences, a key in the sub-domain on which the ciphers are equivalent is used. When only the first audience or only the second audience is allowed access to the message, a key is used that is outside this sub-domain. In a particular example, both the key and the message can even be broadcasted and only the intended audience, viz. the audience with the right credentials as per the key is able to decrypt it. This scheme can be used to identify an audience (customer), update software, key, and piecewise equivalent ciphers (revocation).

Consider a cipher C with key k. According to an aspect of the present disclosure, C is mixed with another cipher C' such that C only behaves correctly if C' does so. More formally, the cipher C is mixed with another cipher C' while at the same time key k is expanded with a key k' in such a way that the combination C|C' is functionally equivalent to cipher C alone (that is, it is possible to perform a particular cryptographic operation using C|C') if, and only if, key k' satisfies certain conditions.

In a particular example, for any text X, $$C \mid C'_{k|k'}(X) = \begin{cases} C_k(X) & \text{if } k' \text{ satisfies the given conditions} \\ \text{error} & \text{if } k' \text{ does not satisfy the given conditions} \end{cases}$$

Equation 1

Now, one or more ciphers $C_i$, for i=1, ..., n, with n a positive integer number, can be designed, where each $C_i$ is piecewise equivalent to C'. That is, there is a subset of the key space for which $C_i$=C'. This subset may be selected differently for each cipher $C_i$, so that keys can be generated that will only work with a particular cipher $C_i$ (for a particular value of i). The distributor can then distribute the software implementations of these ciphers C|$C_i$ and the keys k|$k_i$, wherein the $C_i$, for i=1, ..., n, are chosen to be piecewise equivalent to C'.

It is possible to design the ciphers C' and $C_i$, for i=1, n, in such a way that the key space formed by the possible keys k|k' has the feature that to guess an alternative key, say $k_a$|$k_a$' that satisfies the 'given conditions' of Equation 1 is at least as hard as guessing k from k|$k_i$. Note also that, according to an aspect of the present disclosure, through this extension of the cipher and the key space the original cipher is not affected nor has it become easier to guess anything.

In the following, a possible construction of the function C|C' is presented. Let the cipher C be a confusion-diffusion cipher. Examples of suitable confusion-diffusion ciphers include, but are not limited to, DES, 3DES, and AES. Take a structurally equivalent cipher C', which is structurally equivalent to C, but has some modification. For example, C' can be created by changing the confusion as per at least one of the S-Boxes of C.

Let C|$C'_{k|k'}$(X) be the Cartesian product, i.e. <$C_k$(X), $C'_{k'}$(X)>, i.e. the output size doubles. The output <$C_k$(X), $C'_{k'}$(X)> may be reduced by limiting the output to $C_k$(X) if, and only if, the output of $C'_{k'}$(X) is the expected one (i.e., satisfies certain conditions).

In this respect, an example condition is $C'_{k'}$(X)=X, or more generally, an example condition is that $C'_{k'}$(X) is a predetermined function of X. Alternatively, the check of whether $C'_{k'}$(X) satisfies the conditions can be an implicit check, for instance using the outcome of $C'_{k'}$(X) by combining it with the next data block to which the cryptographic operation is applied. Such a procedure is known, for example, as a cipher-block-chaining (CBC) mode. This way, the outcome of $C'_{k'}$(X) may be used as a nonce. The outcome of $C'_{k'}$(X) may be used as a session key, in a way known in the art by itself. For an attacker it is difficult to guess for which (sub)key the conditions are met, since C', through the change of the S-Boxes, has become an "unknown" function.

The creation of piecewise equivalent ciphers with respect to the key space can be done by designing the functions that manipulate key material piecewise equivalent. In both AES and DES, one of the functions that manipulate the key material is the xor to which one argument is the (round) key, which is denoted in this paragraph by k, and the other argument is related to the data/message that is being processed. We could refer to this function as $\oplus_k$. Considering that the cipher C' involves the operation $\oplus_k$ then a piecewise equivalent cipher $C_i$, for some i, can be derived from C' by creating a piecewise equivalent function to $\oplus_k$. An example of a piecewise equivalent function to $\oplus_k$ is:

$$\otimes_k(x) = \begin{cases} x \text{ xor } k & \text{if } k = 4 \\ x \text{ xor } k \text{ xor } 5 & \text{if } k \neq 4 \end{cases}.$$

Note that this is only an example, wherein $\otimes_k$(x) equals $\oplus_k$ for all values of k except 4. Note that if we replace in $C_i$ in a round only one $\oplus_k$ by $\otimes_k$, then this new cipher $C_i$ is only functionally equivalent to C' if the relevant (sub)key material is equal to k. Since the key schedules are invertible the skilled person can determine all keys k' for which the ciphers $C_i$ and C' are piecewise equivalent.

In a secure virtual machine (SVM) implementation, the link between C and $C_i$ can be perfectly hidden by establishing this link within a single table. This table may incorporate encodings of its input and output, as is known in the art. See for example White-box technology is known from for example Chow et al.

To achieve this situation each step of the cipher $C_i$ may be combined with a step of the cipher C. The intermediate result of the step may be encoded; that is, the information relating to the input and output of the step of the cipher C may be mixed with the information relating to the input and output, respectively, of the corresponding step of the cipher $C_i$. The check of the conditions on the output of $C_i$ can also be performed in this encoded domain, so that an attacker cannot easily extract the output of C if the conditions have not been met. Here, it helps that C' is structurally equal to $C_i$. Likewise, the keys k and k' are mixed by an encryption/encoding and this ensures that an attacker has no clue what the relationship is between the bits in the combined key k|k' and the bits of the constituting keys k and k' he is guessing. Through the encryption of k and k' these values become inseparable to the attacker.

In today's credit cards or payment applications on phones we have validation keys which are used in the plain. If such a validation key is replaced with an extended key k|k', as described above, the key cannot be easily used on other credit cards without copying other aspects of the card. Similar to white box techniques, the validation key can be different for everybody, but at least some of the solutions disclosed herein may have a smaller footprint in terms of used storage space compared to existing white box implementations. Moreover, at least some of the solutions disclosed herein have a random functionality which is unknown to an attacker and every time different.

Advantageous embodiments for biometric verification are set out in the following clauses. The Applicants hereby give notice that new claims may be formulated to such clauses and/or combinations of such clauses and/or features taken from the description, during prosecution of the present application or of any further application derived therefrom. The means introduced in the clauses below may, e.g., be implemented as the respective corresponding units as set forth herein.

1. A System for Cryptographic Processing, Comprising:
   message means (1, 7, 12) for providing a first message representation (3, 6, 11), wherein the first message representation is a representation of a message;
   key means (2) for providing a key representation (4, 9, 14), wherein the key representation is an encrypted representation of a first key of a first cryptographic algorithm and a second key of a second cryptographic algorithm, wherein the first cryptographic algorithm is different from the second cryptographic algorithm;
   step means (5, 10, 15) for performing a step of the first cryptographic algorithm and a step of the second cryptographic algorithm based on the first message representation (3, 6, 11) and the key representation, to obtain a second message representation (6, 11, 16), wherein the second message representation is an encrypted representation of a result of the step of the first cryptographic algorithm and a result of the step of the second cryptographic algorithm.

2. The system of clause 1, wherein the step means (5, 10, 15) comprises a look-up means for looking up the second encrypted representation in a look-up table or a network of look-up tables, wherein the look-up table or network of look-up tables comprises a mapping from combinations of first message representations and key representations to corresponding second message representations.

3. The system of clause 1, wherein the step of the first cryptographic algorithm and the step of the second cryptographic algorithm involve the same operation, wherein at least one parameter of the operation of the step of the first cryptographic algorithm is different from the corresponding parameter of the step of the second cryptographic algorithm.

4. The system of clause 1, wherein the first cryptographic algorithm comprises a first sequence of steps, and the second cryptographic algorithm comprises a corresponding second sequence of steps, wherein the message means (7) is configured to provide the first message representation (6), wherein the first message representation (6) is an encrypted representation of a result of a previous step of the first cryptographic algorithm and a result of a previous step of the second cryptographic algorithm obtained from a further step means (5) for performing the previous step of the first cryptographic algorithm and the previous step of the second cryptographic algorithm based on a message representation (3) and a key representation (4).

5. The system of clause 1, further comprising a validation means (17) for validating the key representation based on a result of the second cryptographic algorithm.

6. The system of clause 5, wherein the validation means (17) is configured to compare an output of the second cryptographic algorithm with an input message.

7. The system of clause 5, wherein the validation means (17) is configured to combine an output of the second cryptographic algorithm with a further first message representation (3) in a cipher block mode.

8. The system of clause 1, wherein the step means (5, 10, 15) is hidden in a white-box cryptographic implementation.

9. Two systems according to clause 1, wherein the first cryptographic algorithm of the first system is identical to the first cryptographic algorithm of the second system, and in which the second cryptographic algorithm of the first system differs from the second cryptographic algorithm of the second system, wherein a plurality of second keys exist for which the second cryptographic algorithm of the first system and the second cryptographic algorithm of the second system have the same result, and a plurality of second keys exist for which the second cryptographic algorithm of the first system and the second cryptographic algorithm of the second system give a different result.

10. A method of cryptographic processing, comprising:
   providing (201) a first message representation, wherein the first message representation is a representation of a message;
   providing (202) a key representation, wherein the key representation is an encrypted representation of a first key of a first cryptographic algorithm and a second key of a second cryptographic algorithm, wherein the first cryptographic algorithm is different from the second cryptographic algorithm; and
   performing (203) a step of the first cryptographic algorithm and a step of the second cryptographic algorithm based on the first message representation and the key representation, to obtain a second message representation, wherein the second message representation is an encrypted representation of a result of the step of the first cryptographic algorithm and a result of the step of the second cryptographic algorithm.

11. A method of providing a system for cryptographic processing, comprising:

providing (301) a means for providing a first message representation, wherein the first message representation is a representation of a message;

providing (302) a means for providing a key representation, wherein the key representation is an encrypted representation of a first key of a first cryptographic algorithm and a second key of a second cryptographic algorithm, wherein the first cryptographic algorithm is different from the second cryptographic algorithm;

providing (303) a step means for performing a step of the first cryptographic algorithm and a step of the second cryptographic algorithm based on the first message representation and the key representation, to obtain a second message representation, wherein the second message representation is an encrypted representation of a result of the step of the first cryptographic algorithm and a result of the step of the second cryptographic algorithm; and keeping (304) at least part of the second algorithm secret.

12. The method of clause 11, comprising (305) providing a second system for cryptographic processing, wherein the first cryptographic algorithm of the first system is identical to the first cryptographic algorithm of the second system, and in which the second cryptographic algorithm of the first system differs from the second cryptographic algorithm of the second system, wherein a plurality of second keys exist for which the second cryptographic algorithm of the first system and the second cryptographic algorithm of the second system have the same result, and a plurality of second keys exist for which the second cryptographic algorithm of the first system and the second cryptographic algorithm of the second system have a different result.

13. The method of clause 12, further comprising providing (306) a message using a second key for which the second cryptographic algorithm of the first system and the second cryptographic algorithm of the second system have the same result if both systems are allowed to access the message, and providing a message using a second key for which the second cryptographic algorithm of the first system and the second cryptographic algorithm of the second system have a different result if either the first system or the second system is not allowed to access the message.

14. A computer program product comprising instructions for causing a processing system to perform the method of clause 10.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each unit of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

An aspect of the invention concerns a computer readable medium having a writable part comprising a computer program, the computer program comprising instructions for causing a processor system to perform a method of cryptographic processing, according to an embodiment. The computer program may be embodied on the computer readable medium as physical marks or by means of magnetization of the computer readable medium. However, any other suitable embodiment is conceivable as well. The computer readable medium may be an optical disc, or any suitable computer readable medium, such as a hard disk, solid state memory, flash memory, etc., and may be non-recordable or recordable. The computer program 1020 comprises instructions for causing a processor system to perform said method.

In an embodiment, the system or the step unit is a processor system. The processor system comprises one or more integrated circuits. For example, a circuit may comprise a processing unit, e.g., a CPU, for running computer program components to execute a method according to an embodiment and/or implement its modules or units; a memory for storing programming code, data, etc. Part of the memory may be read-only. The circuit may comprise a communication element, e.g., an antenna, connectors or both, and the like. The circuit may comprise a dedicated integrated circuit for performing part or all of the processing defined in the method. The processor, memory, and the optional dedicated IC, and communication element may be connected to each other via an interconnect, say a bus. The processor system may be arranged for contact and/or contact-less communication, using an antenna and/or connectors, respectively.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several units, several of these units may be embodied by one and the same item of hardware. The mere fact that certain measures are recited in mutually different dependent claims does not indicate that a combination of these measures cannot be used to advantage.

The invention claimed is:

1. A system for cryptographic processing, comprising:
   a message unit for providing a first message representation, wherein the first message representation is a representation of a message;
   a key unit for providing a key representation, wherein the key representation is an encrypted representation of a first key of a first cryptographic algorithm and a second key of a second cryptographic algorithm, wherein the first cryptographic algorithm is different from the second cryptographic algorithm; and
   a step unit for performing a step of the first cryptographic algorithm and a step of the second cryptographic algorithm based on the first message representation and the key representation, to obtain a second message representation, wherein the second message representation is an encrypted representation of a result of the step of the first cryptographic algorithm and a result of the step of the second cryptographic algorithm.

2. The system of claim 1, wherein the step unit comprises a look-up unit for looking up a second encrypted representation in a look-up table or a network of look-up tables, wherein the look-up table or network of look-up tables comprises a mapping from combinations of first message representations and key representations to corresponding second message representations.

3. The system of claim 1, wherein the step of the first cryptographic algorithm and the step of the second cryptographic algorithm involve the same operation, wherein at least one parameter of the operation of the step of the first cryptographic algorithm is different from the corresponding parameter of the step of the second cryptographic algorithm.

4. The system of claim 1, wherein the first cryptographic algorithm comprises a first sequence of steps, and the second cryptographic algorithm comprises a corresponding second sequence of steps, wherein the message unit is configured to provide the first message representation, wherein the first message representation is an encrypted representation of a result of a previous step of the first cryptographic algorithm and a result of a previous step of the second cryptographic algorithm obtained from a further step unit for performing the previous step of the first cryptographic algorithm and the previous step of the second cryptographic algorithm based on a message representation and a key representation.

5. The system of claim 1, further comprising a validation unit for validating the key representation based on a result of the second cryptographic algorithm.

6. The system of claim 5, wherein the validation unit is configured to compare an output of the second cryptographic algorithm with an input message.

7. The system of claim 5, wherein the validation unit is configured to combine an output of the second cryptographic algorithm with a further first message representation in a cipher block mode.

8. The system of claim 1, wherein the step unit is hidden in a white-box cryptographic implementation.

9. Two systems according to claim 1, wherein the first cryptographic algorithm of the first system is identical to the first cryptographic algorithm of the second system, and in which the second cryptographic algorithm of the first system differs from the second cryptographic algorithm of the second system, wherein a plurality of second keys exist for which the second cryptographic algorithm of the first system and the second cryptographic algorithm of the second system have the same result, and a plurality of second keys exist for which the second cryptographic algorithm of the first system and the second cryptographic algorithm of the second system give a different result.

10. The two systems according to claim 9, wherein the message units of the first and second system are configured for
   providing a message using a second key for which the second cryptographic algorithm of the first system and the second cryptographic algorithm of the second system have the same result if both systems are allowed to access the message, and
   providing a message using a second key for which the second cryptographic algorithm of the first system and the second cryptographic algorithm of the second system have a different result if either the first system or the second system is not allowed to access the message.

11. A step unit for cryptographic processing, the step unit being configured for
   performing a step of a first cryptographic algorithm and a step of a second cryptographic algorithm based on a first message representation and a key representation, to obtain a second message representation, wherein the second message representation is an encrypted representation of a result of the step of the first cryptographic algorithm and a result of the step of the second cryptographic algorithm, wherein
   the first message representation is a representation of a message, and
   the key representation is an encrypted representation of a first key of the first cryptographic algorithm and a second key of the second cryptographic algorithm, wherein the first cryptographic algorithm is different from the second cryptographic algorithm.

12. A method of cryptographic processing, comprising:
   providing a first message representation, wherein the first message representation is a representation of a message;
   providing a key representation, wherein the key representation is an encrypted representation of a first key of a first cryptographic algorithm and a second key of a second cryptographic algorithm, wherein the first cryptographic algorithm is different from the second cryptographic algorithm; and
   performing a step of the first cryptographic algorithm and a step of the second cryptographic algorithm based on the first message representation and the key representation, to obtain a second message representation, wherein the second message representation is an encrypted representation of a result of the step of the first cryptographic algorithm and a result of the step of the second cryptographic algorithm.

13. A non-transitory computer-readable storage medium encoded with a computer program comprising instructions for causing a processing system, when executing the instructions, to perform the method of claim 12.

* * * * *